United States Patent
Kundu et al.

(10) Patent No.: US 12,493,753 B2
(45) Date of Patent: Dec. 9, 2025

(54) METHODS AND SYSTEMS FOR PREDICTING DIFFICULTY OF LONG FORM TECHNICAL QUESTIONS USING WEAK SUPERVISION

(71) Applicant: Tata Consultancy Services Limited, Mumbai (IN)

(72) Inventors: Arpita Kundu, Kolkata (IN); Subhasish Ghosh, Kolkata (IN); Pratik Saini, Noida (IN); Indrajit Bhattacharya, Kolkata (IN); Tapas Nayak, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 314 days.

(21) Appl. No.: 18/454,136

(22) Filed: Aug. 23, 2023

(65) Prior Publication Data
US 2024/0111964 A1   Apr. 4, 2024

(30) Foreign Application Priority Data
Sep. 23, 2022   (IN) .............................. 202221054666

(51) Int. Cl.
*G06F 40/40* (2020.01)
*G06F 16/35* (2025.01)
(Continued)

(52) U.S. Cl.
CPC .............. *G06F 40/40* (2020.01); *G06F 16/35* (2019.01); *G06F 40/137* (2020.01); *G06F 40/186* (2020.01)

(58) Field of Classification Search
CPC ........ G06F 40/40; G06F 16/35; G06F 40/137; G06F 40/186; G06F 40/211; G06F 40/289; G06F 40/30
See application file for complete search history.

(56) References Cited

U.S. PATENT DOCUMENTS 10,424,217 B1 * 9/2019 Sheehan .............. G09B 17/003
2008/0126319 A1 * 5/2008 Bukai .................. G06F 16/951
(Continued)

FOREIGN PATENT DOCUMENTS

CN   111310463 A   6/2020
CN   111784048 A   10/2020

OTHER PUBLICATIONS

Qiu et al., "Question Difficulty Prediction for Multiple Choice Problems in Medical Exams," CIKM (2019).

*Primary Examiner* — Athar N Pasha
(74) *Attorney, Agent, or Firm* — Finnegan, Henderson, Farabow, Garrett & Dunner, LLP (57) ABSTRACT

Technical interviewing is important for organizations for assessing a candidate to make hiring decision. For effective technical interviewing, predicting difficulty of long form technical questions is crucial. The present disclosure provides systems and methods for predicting difficulty of long form technical questions using weak supervision from textbooks. Further, zero shot pre-trained large language models and unsupervised template-based technique are used for generating questions. Furthermore, a difficulty score is assigned to the generated questions based on context difficulty and task difficulty. The context difficulty for the generated questions is computed using hierarchical structure of the textbooks, and the task difficulty is computed by determining a similarity between the generated questions and Bloom's taxonomy levels. In the present disclosure, few supervised question difficulty prediction models are trained by means of weak supervision using the generated questions and corresponding difficulty scores and further evaluated for prediction performance using a gold-standard question difficulty dataset.

15 Claims, 3 Drawing Sheets

(51) Int. Cl.
    *G06F 40/137*     (2020.01)
    *G06F 40/186*     (2020.01)

(56) References Cited

U.S. PATENT DOCUMENTS

2020/0312179 A1* 10/2020 Desai .................. G09B 7/08
2022/0374426 A1* 11/2022 Thai .................. G06N 5/041
2023/0142414 A1*  5/2023 Asgekar ............... G09B 5/12
                                                        434/350

\* cited by examiner

METHODS AND SYSTEMS FOR PREDICTING DIFFICULTY OF LONG FORM TECHNICAL QUESTIONS USING WEAK SUPERVISION

PRIORITY CLAIM

This U.S. patent application claims priority under 35 U.S.C. § 119 to: India Application No. 202221054666, filed on Sep. 23, 2022. The entire contents of the aforementioned application are incorporated herein by reference.

TECHNICAL FIELD

The disclosure herein generally relates to the field of question difficulty prediction, and, more particularly, to methods and systems for predicting difficulty of long form technical questions using weak supervision.

BACKGROUND

Technical interviewing is immensely important for organizations for assessing a candidate to make a hiring decision. For effective technical interviewing, predicting difficulty of questions is crucial for technical interviews, where question difficulty indicates a probability of a candidate correctly answering the question. Traditionally, difficulty of multiple-choice questions or factoid questions for reading comprehension or exam is predicted. However, questions for technical interviewing are long-form and more open-ended than factoid and multiple-choice questions for question difficulty prediction. Traditional approaches, particularly recent deep learning models, require large volumes of candidate response data to train models. This is a challenge when creating a question bank for a new domain or a subject since field tests need to be performed with real students.

SUMMARY

Embodiments of the present disclosure present technological improvements as solutions to one or more of the above-mentioned technical problems recognized by the inventors in conventional systems. For example, in one embodiment, a processor implemented method is provided. The method comprising receiving, via one or more hardware processors, a plurality of domain related textbooks, wherein a gold-standard question difficulty dataset is created from the plurality of domain related textbooks, and wherein the gold-standard question difficulty dataset comprises a plurality of pairs of sample questions and a plurality of sample relative difficulty scores corresponding to the plurality of pairs of sample questions; generating, via the one or more hardware processors, a plurality of questions from the plurality of domain related textbooks using at least one of (i) an unsupervised template-based technique and (ii) a zero shot pretrained large-language (PLLM) model; computing, via the one or more hardware processors, a context difficulty and a task difficulty for each of the plurality of questions, wherein the context difficulty for each of the plurality of questions is computed using a hierarchical structure of the plurality of domain related textbooks, and wherein the task difficulty is computed by determining a similarity between the plurality of questions and a plurality of levels of a Bloom's taxonomy structure; computing, via the one or more hardware processors, a difficulty score for each of the generated plurality of questions based on the context difficulty and the task difficulty; and training, via the one or more hardware processors, a supervised question difficulty prediction model by means of weak supervision using the generated plurality of questions and corresponding difficulty scores as a silver-standard training data.

In another aspect, a system is provided. The system comprising a memory storing instructions; one or more communication interfaces; and one or more hardware processors coupled to the memory via the one or more communication interfaces, wherein the one or more hardware processors are configured by the instructions to receive, a plurality of domain related textbooks, wherein a gold-standard question difficulty dataset is created from the plurality of domain related textbooks, and wherein the gold-standard question difficulty dataset comprises a plurality of pairs of sample questions and a plurality of sample relative difficulty scores corresponding to the plurality of pairs of sample questions; generate, a plurality of questions from the plurality of domain related textbooks using at least one of (i) an unsupervised template-based technique and (ii) a zero shot pretrained large-language (PLLM) model; compute, a context difficulty and a task difficulty for each of the plurality of questions, wherein the context difficulty for each of the plurality of questions is computed using a hierarchical structure of the plurality of domain related textbooks, and wherein the task difficulty is computed by determining a similarity between the plurality of questions and a plurality of levels of a Bloom's taxonomy structure; compute, a difficulty score for each of the generated plurality of questions based on the context difficulty and the task difficulty; and train, a supervised question difficulty prediction model by means of weak supervision using the generated plurality of questions and corresponding difficulty scores as a silver-standard training data.

In yet another aspect, a non-transitory computer readable medium is provided. The non-transitory computer readable medium comprising receiving, a plurality of domain related textbooks, wherein a gold-standard question difficulty dataset is created from the plurality of domain related textbooks, and wherein the gold-standard question difficulty dataset comprises a plurality of pairs of sample questions and a plurality of sample relative difficulty scores corresponding to the plurality of pairs of sample questions; generating, a plurality of questions from the plurality of domain related textbooks using at least one of (i) an unsupervised template-based technique and (ii) a zero shot pretrained large-language (PLLM) model; computing, a context difficulty and a task difficulty for each of the plurality of questions, wherein the context difficulty for each of the plurality of questions is computed using a hierarchical structure of the plurality of domain related textbooks, and wherein the task difficulty is computed by determining a similarity between the plurality of questions and a plurality of levels of a Bloom's taxonomy structure; computing, a difficulty score for each of the generated plurality of questions based on the context difficulty and the task difficulty; and training, a supervised question difficulty prediction model by means of weak supervision using the generated plurality of questions and corresponding difficulty scores as a silver-standard training data.

In accordance with an embodiment of the present disclosure, the one or hardware are further configured to predict, the difficulty score for each sample question in the plurality of pairs of sample questions using the trained supervised question difficulty prediction model by means of the weak supervision; and evaluate, prediction performance of the question difficulty model trained by means of weak supervision using the gold-standard question difficulty dataset based on a comparison of the predicted difficulty score for each sample question in the plurality of pairs of sample questions with a corresponding sample relative difficulty score from the plurality of sample relative difficulty scores.

In accordance with an embodiment of the present disclosure, the generated plurality of questions are long form technical questions.

In accordance with an embodiment of the present disclosure, the step of computing the context difficulty for each of the plurality of questions comprising identifying a set of hierarchy levels from one or more parts of the plurality of domain related textbooks for each question from the generated plurality of questions. In an embodiment, the one or more part of the plurality of domain related textbooks are indicative of the parts from where a corresponding question is generated; Further, (i) a level difficulty score and (ii) a level weight is assigned to each hierarchy level from the set of hierarchy levels; and the context difficulty is calculated based on a level weighted sum of the level difficulty scores of the set of hierarchy levels.

In accordance with an embodiment of the present disclosure, the step of computing the task difficulty for each of the plurality of questions comprising: determining, (i) a verb similarity, (ii) a template similarity, and (iii) a Wh word similarity between the generated plurality of question and the one or more levels of the Bloom's taxonomy (BT) structure; computing, an average of (i) the verb similarity, (ii) the template similarity, and (iii) the Wh word similarity between the generated plurality of question and the plurality of levels of the Bloom's taxonomy (BT) structure to obtain a BT level similarity for each of the plurality of questions; and computing, a level difficulty score weighted sum of the BT level similarity for each of the plurality of questions to obtain the task difficulty for each of the plurality of questions. In an embodiment, the level difficulty score is obtained by assigning a difficulty score to each of the plurality of levels of the Bloom's taxonomy (BT) structure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Technical interviewing is immensely important for organizations for assessing a candidate to make hiring decision. For effective technical interviewing, predicting difficulty of questions is crucial for technical interviews, where question difficulty indicates a probability of a candidate correctly answering the question. The present disclosure addresses problem of predicting the difficulty of technical interview questions for candidates. Traditionally, prediction of difficulty from question statement, answer choices and related documents has been performed for multiple choice or factoid questions for reading comprehension and exams. Further, all publicly available datasets also contain multiple choice or factoid questions. However, nature of technical assessment questions in interviews is different. Technical interviews are conducted to assess knowledge and understanding of candidates rather than memorization of facts and are more open-ended. Further, questions of the technical interview are long-form as answers to the questions typically span 2-5 sentences. Traditional approaches, particularly recent deep models, require large volumes of candidate response data to train models. This is a challenge when creating a question bank for a new domain or a subject since field tests need to be performed with real students.

The present disclosure addresses the unresolved problems of traditional methods of question difficulty prediction by training question difficulty prediction models using weak supervision based on subject textbooks and Bloom's Taxonomy. This removes dependency on candidate responses and answer assessment. Embodiments of the present disclosure provide systems and methods for predicting difficulty of long form technical questions using weak supervision. In the present disclosure, various strategies of creating weakly-supervised training data are explored. Though, weak supervision has been explored extensively for many NLP tasks, for question difficulty, the training data requires not just difficulty scores but technical interview questions as well. Further, zero shot pre-trained large language models such as GPT3 and unsupervised template-based technique are used for generating training questions. Further, a difficulty score is assigned to the generated questions using an unsupervised algorithm that uses subject textbooks and Bloom's Taxonomy. While Bloom's Taxonomy has been used extensively in computer educational testing and for analysis of difficulty for short answer questions, but not in predictive models. For evaluation, in the present disclosure, a dataset of technical interview questions with difficulty scores is created from an authoritative textbook of a subject such as Deep Learning. The dataset is used to evaluate performance of state-of-the-art Question difficulty estimation (QDE) models when trained using weak-supervision. In the present disclosure, both challenges of task as well as promise of weak-supervision for the task is analyzed.

More Specifically, the present disclosure describes the following:
1. Task of difficulty prediction for technical interview questions is introduced and a dataset for this task is curated.
2. Multiple forms of weak-supervision for the task of difficulty prediction for technical interview questions are created and an analysis of performance comparison with state-of-the-art models is performed.

3. An unsupervised algorithm for question difficulty prediction based on textbook structure and Bloom's Taxonomy is provided. Aside from use in weak supervision, a competitive performance of the unsupervised question difficulty prediction algorithm is demonstrated individually.

Referring now to the drawings, and more particularly to FIGS. 1 through 3B, where similar reference characters denote corresponding features consistently throughout the figures, there are shown preferred embodiments and these embodiments are described in the context of the following exemplary system and/or method.

Figure 1:
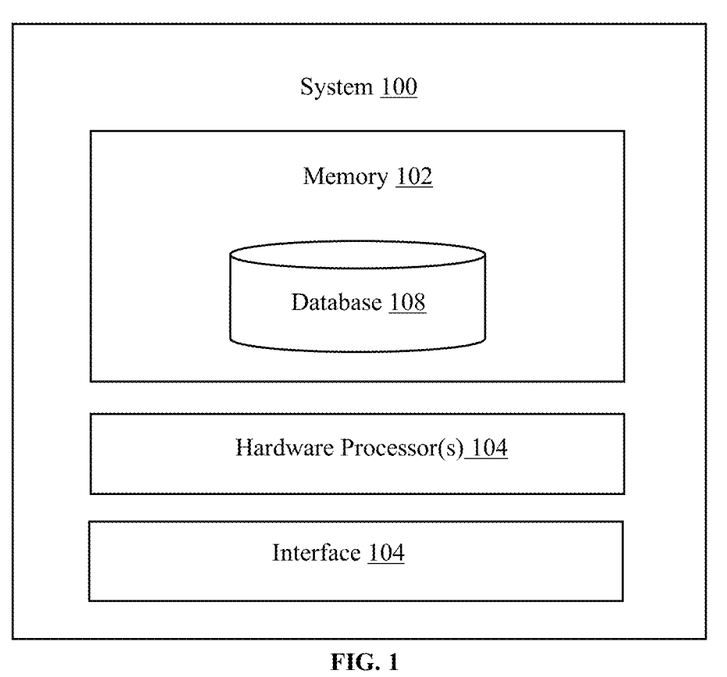
FIG. 1 illustrates an exemplary system for predicting difficulty of long form technical questions using weak supervision according to some embodiments of the present disclosure.

FIG. 1 illustrates an exemplary system 100 for predicting difficulty of long form technical questions using weak supervision according to some embodiments of the present disclosure. In an embodiment, the system 100 includes one or more hardware processors 104, communication interface device(s) or input/output (I/O) interface(s) 106 (also referred as interface(s), and one or more data storage devices or memory 102 operatively coupled to the one or more hardware processors 104.

The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W 5 and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 may also be configured to update data stored, at least based on the data obtained from the I/O interface(s) 106. The memory 102 also includes a database 108 which is used to store a plurality of domain related textbook received by the system 100. The memory 102 may also store generated questions and corresponding one or more difficulty scores, one or more datasets such as weak supervision dataset, Bloom's Taxonomy levels, one or more machine learning models such as zero shot pretrained large-language (PLLM) models, a supervised question difficulty prediction model, regression models, and/or the like, data associated with the one or more machine learning models, in one or more associated databases. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
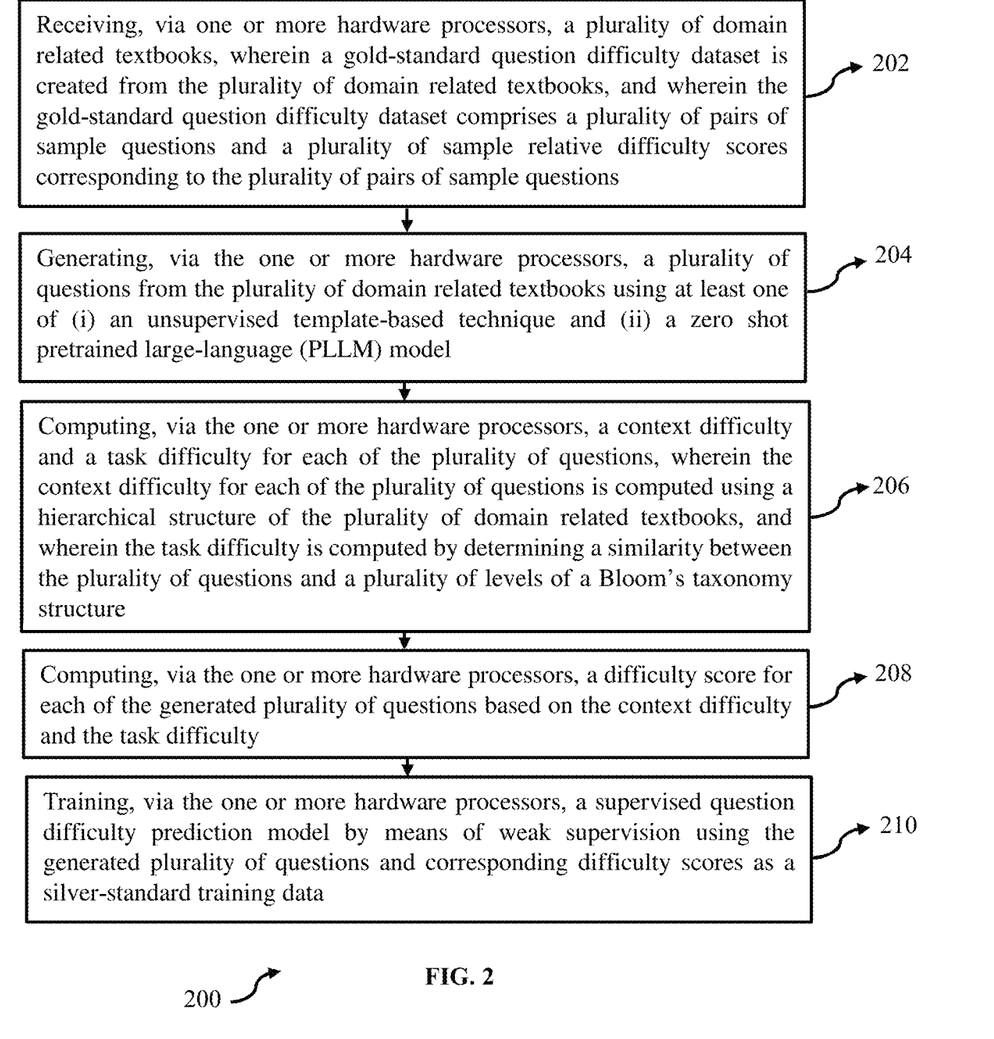
FIG. 2 illustrates an exemplary flow diagram illustrating a method for predicting difficulty of long form technical questions using weak supervision in accordance with some embodiments of the present disclosure.

FIG. 2, with reference to FIG. 1, depicts an exemplary flow chart illustrating a method 200 for predicting difficulty of long form technical questions using weak supervision, using the system 100 of FIG. 1, in accordance with an embodiment of the present disclosure.

Referring to FIG. 2, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously. In an embodiment, at step 202 of the present disclosure, the one or more hardware processors 104 are configured to receive, a plurality of domain related textbooks. In an embodiment, the plurality of domain related textbooks could be related but not limited to machine learning, deep learning, medical domain, finance domain, analytics domain, and/or the like. In an embodiment, a gold-standard question difficulty dataset is created from the plurality of domain related textbooks. The gold-standard is an accepted standard that is used as an accurate and reliable reference. In the question difficulty dataset, as both the question and relative difficulty score are annotated by human expert, it is assumed as a reliable reference and called as gold-standard question difficulty dataset. The gold-standard question difficulty dataset comprises a plurality of pairs of sample questions and a plurality of sample relative difficulty scores corresponding to the plurality of pairs of sample questions. The gold-standard question difficulty dataset is created based on human annotations and the plurality of pairs of sample questions and the plurality of sample relative difficulty scores corresponding to the plurality of pairs of sample questions are provided by human annotators based on domain knowledge and expertise. For example, the human annotators familiar with technical interviewing generate interview questions. A chapter from a textbook of a subject is given to two human annotators who reach agreement over validity of generated sample questions. However, attempts to annotate difficulty of individual questions may lead to very low inter-annotator agreement. Even though, the human annotators are unable to reliably assign absolute difficulty scores to questions, they are able to assign relative difficulty of pair of sample questions more reliably. For example, it is easy to be predicted by the human annotators if a first question is easier or a second question is easier or they are equally difficult/easy. Thus, the relative difficulty for the plurality of pairs of sample questions is attempted with three possible labels: (a) Q1 more difficult (b) Q2 more difficult and (c) equally difficult/easy. Further, the human annotators are also asked to provide difficulty explanation label for each question. There are nine possible labels along with 'other'. The nine possible labels include 'Is about a fundamental concept', 'Is about an obscure concept', 'Involves many prerequisite concepts', 'Does not involve a lot of prerequisite concepts', 'Involves intricate mathematics', 'Involves very little or no mathematics', 'Appears early in the book or is otherwise highlighted', 'Appears towards the end of the book or is otherwise hidden', and 'Other'. The human annotators are advised to decide pair-wise difficulty using the explanations for the two sample questions. In an embodiment, the plurality of pairs of sample questions are selected for annotation after running an unsupervised difficulty prediction algorithm. Further, each pair of sample questions is annotated by five human annotators and a final label is obtained by majority votes. After first round, ties are broken by another two annotators. In another embodiment, quality evaluation is performed for each annotator and for each pair of sample questions, the final label is obtained as quality weighted aggregation over human annotator's labels.

In an embodiment, at step 204 of the present disclosure, the one or more hardware processors 104 are configured to generate a plurality of questions from the plurality of domain related textbooks using at least one of (i) an unsupervised template-based technique and (ii) a zero shot pretrained large-language (PLLM) model. In an embodiment, the unsupervised template-based technique considers several templates for generating the plurality of questions. For example, templates such as 'What is x?', 'Define x.', 'Explain x.', 'What are benefits/advantages/disadvantages of x?', 'Compare x and y.', and/or the like. For each template, the unsupervised template-based technique uses precise regular expressions with dictionaries to check its applicability for a sentence. In present disclosure, a concept dictionary constructed using textbook index is used to detect occurrences of X in the sentence. In an embodiment, the zero shot pretrained large-language (PLLM) model could be a generative pre-trained transformer 3 (GPT3) which may be used by providing each paragraph of a textbook from the plurality of the domain related textbooks. In the present disclosure, prompting with GPT3 Interview Question preset is used to generate interview questions from textbook contexts. In the GPT3 prompt, a context (part of a section) from the textbook is provided, followed by a new line and an instruction. For example, the GPT3 interview question preset is used with a prompt such as 'Generate a list of questions from the above passage' for each paragraph of the textbook. For example, for a given paragraph 'A machine learning algorithm is an algorithm that is able to learn from data. But what do we mean by learning? Mitchell (1997) provides a succinct definition: A computer program is said to learn from experience with respect to some class of tasks and performance measure, if its performance at tasks in, as measured by, improves with experience.' and the prompt 'Generate a list of questions from the above passage', GPT3 generates questions such as 'What is machine learning?', 'What is learning?', 'What is a computer program?', 'What is experience?', 'What is a task?', and 'What is a performance measure?'. In an embodiment, if the domain related textbooks received as the input are related to textbooks on machine learning, then, some examples of the plurality of questions generated from these books may include 'What is machine learning?', 'How can you use machine learning for spam detection?', 'What is span detection?', and/or the like. In an embodiment, the generated plurality of questions are long form technical questions.

In an embodiment, at step 206 of the present disclosure, the one or more hardware processors 104 are configured to compute, a context difficulty and a task difficulty for each of the plurality of questions. In an embodiment, the step of computing the context difficulty for each of the plurality of questions comprising identifying a set of hierarchy levels from one or more parts of the plurality of domain related textbooks for each question from the generated plurality of questions. Here, the one or more part of the plurality of domain related textbooks are indicative of the parts from where a corresponding question is generated. Further, (i) a level difficulty score and (ii) a level weight to each hierarchy level from the set of hierarchy levels is assigned and the context difficulty is calculated based on a level weighted sum of the level difficulty scores of the set of hierarchy levels. In other words, the context difficulty for each of the plurality of questions is computed using a hierarchical structure of the plurality of domain related textbooks. Thus, to compute the context difficulty for each of the plurality of questions, hierarchy levels for parts of the book is identified which may include chapter number, section number, subsection number, and/or the like. For example, if a question such as 'what is machine learning?' is generated from 1.1.2, this indicates chapter no is 1, section no is 1 and subsection is 2. Further, a difficulty score is assigned to each level by dividing the number at that level by maximum number possible at that level assuming that later parts of a textbook are harder because these have more pre-requisites. For example, if maximum number of chapters in the book is 14, then difficulty score of chapter level is 1/14. Similarly, the difficulty score of section level is 1/8 where 8 is maximum section number. Finally, for subsection it is 2/9 as 9 is the maximum subsection number. Further, some level weights are assigned to each level such as 1, 0.1 and 0.01 for levels respectively. Thus, the context difficulty is computed as level weighted sum of the difficulty of levels. For example, the context difficulty based on a level weighted sum of the level difficulty scores for this question is (1*1/14)+(0.1*1/8)+ (0.01*2/9)=0.086. Similarly, the context difficulty of questions such as 'How can you use machine learning for spam detection?' is 0.29 as the question is generated from the part 3.6 of the same textbook. Moreover, context difficulty of the question 'What is span detection?' is 0.28 as it is generated from part 3.5. The context difficulty is computed using that specific part of the book from which a question is generated.

In an embodiment, the task difficulty is computed by determining similarity between the plurality of questions and a plurality of levels of a Bloom's taxonomy structure. In an embodiment, the step of computing the task difficulty for each of the plurality of questions comprising determining, (i) a verb similarity, (ii) a template similarity, and (iii) a Wh word similarity between the generated plurality of question and the plurality of levels of the Bloom's taxonomy (BT) structure. In an embodiment, each level of the plurality of levels of the Bloom's taxonomy (BT) structure are associated with different cognitive complexity such as REMEMBER, UNDERSTAND, APPLY, ANALYZE, EVALUATE and CREATE. Further, the verb similarity, the template similarity and Wh similarity are computed with respect to each level of the plurality of levels of Bloom's taxonomy structure. In an embodiment, each level of Bloom's taxonomy structure is defined using Wh word lists, template list, and verb list. To find the verb similarity, verbs of the generated plurality of questions are identified using a spacy POS tagger and objects of the generated plurality of question are identified using a spacy dependency parser. The verb similarity is computed by embedding the identified verbs of the generated plurality of questions and verbs of each BT level using word2vec and determining a maximum pair-wise similarity. For computing the template similarity, the generated plurality of questions are templatized by masking the verbs and the objects. Further, the template similarity is computed by embedding the template of the generated plurality of questions and templates of each of the BT level using a pre-trained Sentence Bidirectional Encoder Representations from Transformers (sBert) and determining maximum similarity. For Wh similarity, existence of a question with Wh word in each level of the BT structure is checked. Further, an average of (i) the verb similarity, (ii) the template similarity, and (iii) the Wh word similarity between the generated plurality of question and the plurality of levels of the Bloom's taxonomy (BT) structure is computed to obtain a BT level similarity for each of the plurality of questions. Furthermore, a level difficulty score weighted sum of the BT level similarity for each of the plurality of questions is computed to obtain the task difficulty for each of the plurality of questions. The level difficulty score is obtained by assigning a difficulty score to each of the plurality of levels of the Bloom's taxonomy (BT) structure. The step of computing the task difficulty is further explained by way of a non-limiting example. For example, the question 'What is machine learning?' has 0 verb similarity with respect to all levels of the Bloom's taxonomy (BT) structure as this question doesn't have any main verb. The template of this question is 'What is X?' after masking verb and object. Now, REMEMBER level has template 'What is/are X?' in its template list. Hence, the question has '0.9' template similarity with respect to REMEMBER level and '0' similarity with other levels. Next, the Wh word of this question is 'What' and 'What' is present in REMEMBER and UNDERSTAND level. So, the question has '1' Wh word similarity with REMEMBER and UNDERSTAND levels and '0' with others. So, the BT level similarity with respect to all BT levels is obtained by averaging the verb similarity, the template similarity and the Wh similarity and provided as: 1.9/3, 1/3, 0, 0, 0, 0 and 0 respectively. The assigned difficulty score of each BT level is: 1, 2, 3, 4, 5 and 6 respectively. Finally, the task difficulty is:

$$\left(\frac{1*1.9}{3}\right)+\left(\frac{2*1}{3}\right)+(3*0)+(4*0)+(5*0)+(6*0)=1.3.$$

For the question 'How can you use machine learning for spam detection?', the detected main verb is 'use'. As 'use' is present in verb list of APPLY level so the verb similarity is '1' for APPLY level and '0' for other levels. The template for this question is 'How can you V X for Y?', thus the template similarity is 0, 0.3, 0.95, 0.2, 0 and 0 for each level respectively. Also, the Wh word in the question is 'How', so the Wh word similarity are 0, 1, 1, 1, 0, 0 and 0 respectively. Then the BT level similarity are 0, 1.3/3, 2.95/3, 1.2/3, 0 and 0. Finally, the task difficulty is 5.4. Moreover, as the verb similarity, the template similarity and Wh word of 'What is span detection?' are same as 'What is machine learning?', task difficulty of 'What is span detection?' is also 1.3.

In an embodiment, at step 208 of the present disclosure, the one or more hardware processors 104 are configured to compute a difficulty score for each of the generated plurality of questions based on the context difficulty and the task difficulty. In an embodiment, the difficulty score for each of the generated plurality of questions is computed as weighted average of normalized context difficulty and normalized task difficulty. For example, weight for the context difficulty is 0.8, weight for the task difficulty is 0.2. The normalized context difficulty and the normalized task difficulty are computed by dividing the context and the task difficulty values by their maximum possible value. For example, if maximum difficulty score of each hierarchical level is 1 and level weights for the chapter, section, subsection are 1, 0.1, 0.01 respectively, so maximum context difficulty is computed as 1*1+0.1*1+0.01*1=1.11. Similarly, maximum similarity with respect to all BT levels is 1 and level difficulty scores are 1, 2, 3, 4, 5 and 6, so maximum task similarity is computed as 1*1+2*1+3*1+4*1+5*1+6*1=21. As maximum value of the normalized context difficulty and the normalized task difficulty are 1, so the computed difficulty score is in range from 0 to 1 and then it is multiplied with 10 to scale the difficulty score from 0 to 10. For the question 'What is machine learning?', the context difficulty and text difficulty are 0.086 and 1.29 and the normalized context and text difficulty are 0.086/1.11 and 1.3/21. Thus, the difficulty score is computed as 10*(0.8*0.086/1.11+ 0.2*1.3/21)=0.74. Similarly, the difficulty score of question 'How can you use machine learning for spam detection?' is 10*(0.8*0.29/1.11+0.2*5.4/21)=2.6 and the difficulty score of question 'What is spam detection?' is 10*(0.8*0.28/1.11+ 0.2*1.3/21)=2.1.

In an embodiment, the steps 206 and 208 are better understood by way of following exemplary explanation.

In the present disclosure, for assigning a difficulty denoted by d(q) to a question q, the context difficulty denoted by $d^c(q)$ is assigned considering the specific part of the book from which the question is generated and the task difficulty (Alternatively referred as cognitive difficulty) denoted by $d^t(q)$ involved in answering the question q is assigned considering the Bloom's Taxonomy structure. To determine context difficulty, it is assumed that questions from later parts of the book, and similarly later parts of a chapter/section/subsection, are likely to have more dependencies on earlier parts, and are therefore more difficult. To assign the context difficulty to the question q, the chapter number represented by $n^0$, the section number represented by $n^1$ and subsection number represented by $n^2$ of a context cis used. The context difficulty is computed as provided in equation (1) below as:

$$d^c(q)=\Sigma_{l=0}^{2}w(l)d(n^l;l) \quad (1)$$

Here, w(l) represents weight of level l, and weights 1, 0.1 and 0.01 are used for chapters, sections and subsections respectively. $d(n^l; l)$ represents the difficulty associated with level number $n^l$ for level l, so that numbers closer to the end have higher difficulty. Here, $d(n^l; l)$ is defined as provided in equation (2) below $$d(n^l;l)=n^l/n_{max}^l \quad (2)$$

Here, $n_{max}^l$ is the maximum value of $n^l$ for a level l.

Further, to determine the task difficulty, the Bloom's Taxonomy structure is used. The Bloom's Taxonomy (BT) structure is a well-known resource for determining complexity of educational and assessment tasks. A cognitive process dimension of BT structure has levels of cognitive ability, namely REMEMBER, UNDERSTAND (e.g., explain, compare, classify), APPLY, ANALYZE, EVALUATE and CREATE, and has action verb dictionaries for each level. First, difficulty scores d(l) are manually assigned to BT levels l. Then the task difficulty $d^t(q)$ of a question q is computed as provided in equation (3) below:

$$d^t(q)=\Sigma_l f(q,l)d(l) \quad (3)$$

To customize BT structure for interviews, taxonomy levels are enriched. To each level, a list of Wh words and a list of question templates are added. For (q,l), the question q and the BT level l are embedded appropriately and their cosine similarity is computed. POS tagging and dependency parsing is performed on the question q using Spacy. For verb similarity, question verbs and level verbs are embedded using word2vec and maximum pair-wise similarity is determined. For template similarity, first the question q is templatized by masking verbs and objects. Further, the question template and level templates are embedded using a pre-trained sBert, and then the maximum similarity is computed. For Wh similarity, existence of the question Wh word in the level is checked. These three similarities are weighted equally to get (q,l). The overall difficulty of the question q is obtained by combining the context difficulty and the task difficulty as provided in equation (4) below:

$$d(q) = wd^c(q) + (1-w)d^t(q) \quad (4)$$

Further, at step 210, the one or more hardware processors 104 are
configured to train any supervised question difficulty prediction model by means of weak supervision using the generated plurality of questions and corresponding difficulty scores as a silver-standard training data. The silver-standard data is created by automation without involvement of human experts. This is less reliable and less accurate than the gold-standard data but easier to get. The silver-standard data can be used as a substitution of the gold-standard data. In the present disclosure, as the plurality of questions and corresponding difficulty scores are generated by algorithms, so they are referred as the silver-standard data. In an embodiment, any supervised question difficulty prediction model is trained by means of weak supervision in different ways. In an embodiment, the supervised question difficulty prediction model could be a transformer based model or a term frequency-inverse document frequency (tf-idf) based model. The transformer based question difficulty estimation (TrQDE) model uses transformers to represent the question, with a final regression layer. The mask language modeling (MLM) layer of TrQDE is pretrained and can be fine-tuned. This supervised transformer based question difficulty estimation (TrQDE) is trained by means of weak supervision in different ways. For example, in model TrQDE(s), the regression layer is fine-tuned using weak supervision data from the textbook of a subject but MLM layer is pretrained. In model TrQDE(s)[s], the MLM layer of TrQDE is fine-tuned on textbook of the subject in addition to TrQDE(s). In model TrQDE (s+rs)[s], the regression layer of the TrQDE model is fine-tuned using weak supervision data from the textbook of a subject and textbooks of related subject and the transformer MLM layer is fine-tuned on textbook of the subject. In model TrQDE(s+rs)[s+rs], the regression layer of the TrQDE model is fine-tuned using weak supervision data from the textbook of the subject and the textbooks of related subject and the transformer MLM layer is also fine-tuned on textbooks of the subject and related subject. For example, in TrQDE(dl+ml)[dl] model, the regression layer is fine-tuned using the weak supervision data from the textbook of deep learning (dl) and the textbook of related subject machine learning (ml) and MLM layer is finetuned on textbook of dl. In an embodiment, regressor for difficulty and discrimination estimation (R2DE) model uses tf-idf representation of the question and perform regression on the tf-idf representation of the question. In R2DE, the regression layer is trainable and fine-tuned using weak supervision data from the textbook of the subject.

At step 212 of FIG. 2, the one or more hardware processors are configured to predict the difficulty score for each sample question in the plurality of pairs of sample questions using the trained supervised question difficulty prediction models by means of weak supervision. For example, TrQDE [dl][dl] predicts difficulty score of sample questions such as 'What is gradient descent?', 'What is steepest descent?' and 'What are advantages of variational approaches? as 2.94, 2.72, and 8.54 respectively.

Referring back to FIG. 2, at step 214, the one or more hardware processors are configured to evaluate prediction performance of the question difficulty model trained by means of weak supervision using the gold-standard question difficulty dataset based on a comparison of the predicted difficulty score for each sample question in the plurality of pairs of sample questions with a corresponding sample relative difficulty score from the plurality of sample relative difficulty scores. For example, the gold-standard question difficulty dataset comprises the sample relative difficulty score of the pair of sample questions 'What is gradient descent?' and 'What is steepest descent?' as 'equally difficult/easy'. In an embodiment, the TrQDE[dl][dl] model predicts the difficulty score of 'What is gradient descent?' and 'What is steepest descent?' as 2.94 and 2.84. These predicted difficulty scores are compared with the sample relative difficulty score of the pair of sample questions. Similarly, the predicted difficulty scores of the questions 'What is gradient descent?' and 'What are advantages of variational approach?' which are 2.94 and 8.54, are compared with the sample relative difficulty value 'Q2 is more difficult' of the question pair 'What is gradient descent?' and 'What are advantages of variational approach?'. Instead of candidate responses from field tests, human annotated difficulty scores are used. Further, pair wise relative difficulty predicted by the question difficulty prediction model is obtained using several rules including i) if absolute difference between the predicted difficulty scores of two questions from a pair of sample questions are less than a threshold, then the relative difficulty is equally difficult/easy, (ii) if first question of the pair has high score, then relative difficulty is Q1 more difficult, else Q2 more difficult. In one embodiment, the threshold lies in a range of 0.1 to 1.5. The pair wise relative difficulty scores predicted by question difficulty estimation model are evaluated with respect to sample relative difficulty scores of the plurality of pairs of sample questions annotated by human using a maximum value of Micro-averaged F1 over the range of threshold. Micro-averaged F1 computes a global average F1 score by counting sums of True Positives (TP), False Negatives (FN), and False Positives (FP) for multi-class setting. In another embodiment, the pair wise relative difficulty scores predicted by question difficulty prediction model are evaluated with respect to sample relative difficulty scores of the plurality of pairs of sample questions annotated by human by first relabeling relative difficulty of human annotations and the question difficulty prediction model predictions from Q1 more difficult, Q2 more difficult and equally difficult/easy to 0.1, +1, and 0 respectively and further computing a minimum mean absolute error (MAE) between human annotations and model predictions over the range of threshold.

Experimental Results

The present disclosure reports experiments on an interview question difficulty dataset. Further, usefulness of the following aspects for weak supervision (WS) is tested: (a) difficulty scores predicted by unsupervised algorithm proposed in the present disclosure, (b) algorithm generated questions, and (c) questions from a related subject.

All experiments were run on an A100 20 GB server and Adam with batch-size 16, learning rate 1E−5, dropout rate 0.5 and 35 epochs were used. Two state-of-the-art models for difficulty prediction for factoid/MCQ questions were evaluated. First state-of-the-art model was R2DE that regresses on questions to predict difficulty. In R2DE ques_only version is considered since no answers were used. The first state-of-the-art model uses a tf-idf representation of the questions. In the present disclosure, performance for linear regression is reported as the regression model, which was the best. Second state-of-the-art model was TrQDE which uses transformers to represent a question, with a final regression layer. The second state-of-the-art model fine-tunes a transformer MLM layer using a question corpus, and then further fine-tunes it for the regression task. In the present disclosure, performance for Distill Bidirectional Encoder Representations from Transformers (DistilBERT), is reported which worked better than Bidirectional Encoder Representations from Transformers (BERT). For Distil-BERT also, q only setting is used in the present disclosure. For unsupervised difficulty prediction algorithm UQDP, w=0.8 is used for combining context and task difficulty.

In the present disclosure, primary weak supervision (WS) silver-standard data or training data covered 20 chapters of a Deep Learning book (e.g., "Deep learning" (Goodfellow, Bengio, Courville)), and had 2536 questions, where 1647 questions were generated using GPT3 model and 889 questions were generated using the unsupervised template-based technique. Further, secondary WS training data covered 20 chapters from a book (e.g., "Pattern Recognition and Machine Learning" (Bishop), also available online) and had 2218 questions, where 1268 questions were generated using GPT3 model and 950 questions were generated using the unsupervised template-based technique. Since the gold-standard dataset or the test set has relative difficulty labels, 'EQUAL' is predicted when difference between a model's predicted difficulty scores for the two questions in a pair is less than a threshold θ. Table 1 below provides a comparison of WS types. In Table 1, Q.Subj. indicates subject of questions in training data such as deep learning (DL), machine learning (ML). Test questions i.e. sample questions in the gold-standard dataset are on deep learning (DL). Further, TrQDE[s] indicates TrQDE with MLM fine-tuned on textbook for subject s. UQDP refers to unsupervised algorithm for difficulty prediction and Micro-avg F1 indicates maximum over the threshold θ.

TABLE 1

| Model | Q.Subj. | Micro F1 |
| --- | --- | --- |
| R2DE | DL | 0.50 |
| TrQDE[—] | DL | 0.51 |
| TrQDE[DL] | DL | 0.54 |
| TrQDE[DL] | DL + ML | 0.53 |
| TrQDE[DL + ML] | DL + ML | 0.525 |
| UQDP | — | 0.51 |

It is observed for Table 1, that trained supervised question difficulty prediction model using the weak supervision data-set (i.e., WS using UQDP) for algorithm generated questions improves performance beyond the performance achieved by using UQDP alone for MLM-fine-tuned versions of TrQDE. This shows the usefulness of both aspects (a) difficulty scores predicted by unsupervised algorithm proposed in the present disclosure and (b) algorithm generated questions. However, R2DE and the TrQDE with just regression-layer fine-tuning cannot beat UQDP. Next, aspect (c) questions from a related subject, is analyzed.

Figure 3A:
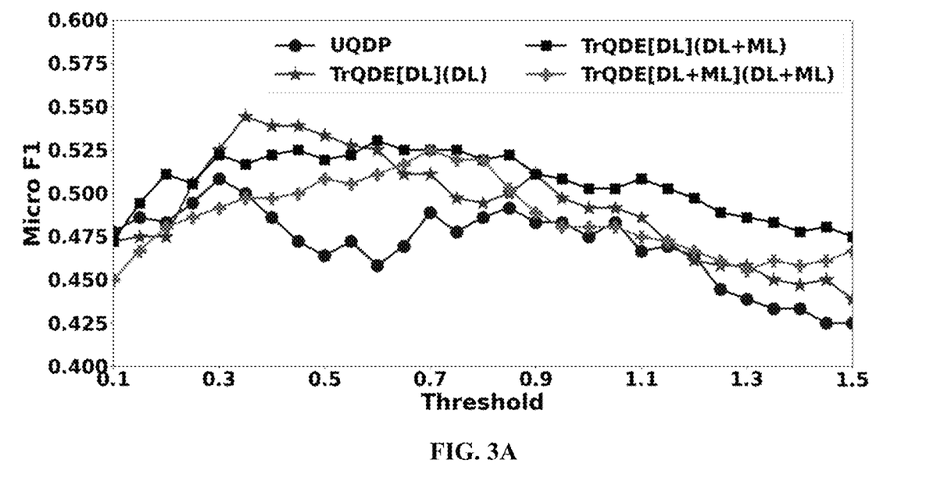
FIGS. 3A and 3B provide a graphical representation illustrating experimental results for predicting difficulty of long form technical questions using weak supervision according to some embodiments of the present disclosure.
Figure 3B:
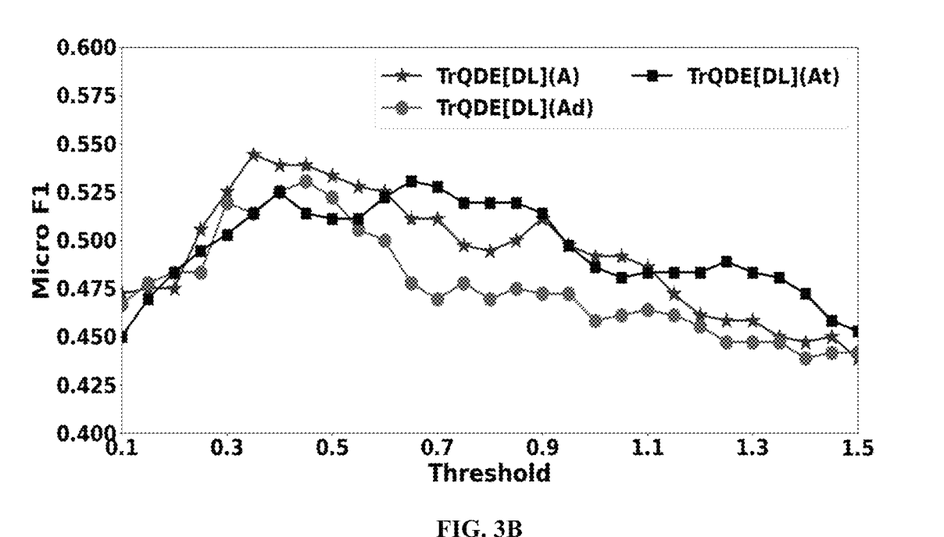

It is noted that UQDP computes difficulty scores of the DL questions in the training data using the DL book and difficulty scores of the ML questions using the ML book. Still, including ML questions to train the regression layer does not help, even after including the ML book to fine-tune the MLM layer. The most likely explanation is that the test questions and difficulties are from DL. Including ML questions changes the train distribution, even though the subjects are quite related. Fine-tuning the MLM-layer fits the altered training distribution more closely, leading to poorer results in test. FIGS. 3A and 3B provide a graphical representation illustrating experimental results for estimating difficulty of long form technical questions using weak supervision according to some embodiments of the present disclosure. FIG. 3A provides a graphical representation of performance of best models in terms of threshold θ, according to some embodiments of the present disclosure. FIG. 3A shows how micro-avg F1 varies across threshold θ for the 3 best models. It is analyzed from FIG. 3A that while peak performance of DL-only training is higher, including ML questions in training results has more stable gains across θ values. However, including the ML book for MLM fine-tuning results in worse performance than both. FIG. 3B provides a graphical representation of performance of question generation algorithms for TrQDE[DL] in terms of threshold θ, according to some embodiments of the present disclosure. The aspect (b) algorithm generated questions, is further investigated in FIG. 3B by plotting performance with respect to the threshold θ when training using different question generation algorithms. It is observed from FIG. 3B that performance is best when both the unsupervised template-based technique and GPT3 generated questions are used. But, interestingly, the unsupervised template-based technique had better performance individually than GPT3 across θ values. This is because the unsupervised template-based technique based questions, though smaller in volume and lacking diversity, better mimic human interview questions seen in test.

In Table 1, it was shown that UQDP itself has competitive performance on the test set, outperforming R2DE and TrQDE without MLM fine-tuning. In an embodiment, aspect (a) difficulty scores predicted by unsupervised algorithm proposed in the present disclosure, is further investigated by performing ablation over different UQDP features. Table 2 below provides investigation results including ablation for unsupervised difficulty prediction algorithm (UQDP) on test data.

TABLE 2

| Ftr | All | C | T | Tt | Tv | Tw |
| --- | --- | --- | --- | --- | --- | --- |
| M. F1 | 0.51 | 0.50 | 0.43 | 0.43 | 0.37 | 0.37 |

In Table 2, C indicates w/only context difficulty, T indicates w/only all aspects of task difficulty, and Tt, Tv, Tw indicate the template similarity, the verb similarity, and the Wh similarity respectively for the task difficulty. It is observed from Table 2 that the context similarity makes most significant contribution but adding the task similarity improves performance slightly. Further, the contributions of the verb similarity and the Wh similarity are limited compared to the template similarity.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

The embodiments of present disclosure provide an artificial intelligence based approach for automated extracted and classification of project initiation related information from the RFP response documents. The method of the present disclosure is validated on an industrial case study for IT services domain. While the technology has been validated for a specific business unit, it can also be easily applied to other business units as the method of the present disclosure is generic and domain agnostic. The method of the present disclosure demonstrates significant improvement in terms of classification accuracy and time consumed to analyze the RFP document by reducing volume of the data comprised in the RFP response document as compared to conventional approaches.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, via one or more hardware processors, a plurality of domain related textbooks, wherein a gold-standard question difficulty dataset is created from the plurality of domain related textbooks, and wherein the gold-standard question difficulty dataset comprises a plurality of pairs of sample questions and a plurality of sample relative difficulty scores corresponding to the plurality of pairs of sample questions;
   generating, via the one or more hardware processors, a plurality of questions from the plurality of domain related textbooks using at least one of (i) an unsupervised template-based technique and (ii) a zero shot pretrained large-language (PLLM) model;
   computing, via the one or more hardware processors, a context difficulty and a task difficulty for each of the plurality of questions, wherein the context difficulty for each of the plurality of questions is computed using a hierarchical structure of the plurality of domain related textbooks, and wherein the task difficulty is computed by determining a similarity between the plurality of questions and a plurality of levels of a Bloom's taxonomy (BT) structure;
   computing, via the one or more hardware processors, a difficulty score for each of the generated plurality of questions based on the context difficulty and the task difficulty; and
   training, via the one or more hardware processors, a supervised question difficulty prediction model by means of weak supervision using the generated plurality of questions and corresponding difficulty scores as a silver-standard training data.

2. The processor implemented method of claim 1, further comprising:
   predicting, the difficulty score for each sample question in the plurality of pairs of sample questions using the trained supervised question difficulty prediction model by means of the weak supervision; and
   evaluating, prediction performance of the question difficulty model trained by means of the weak supervision using the gold-standard question difficulty dataset based on a comparison of the predicted difficulty score for each sample question in the plurality of pairs of sample questions with a corresponding sample relative difficulty score from the plurality of sample relative difficulty scores.

3. The processor implemented method of claim 1, wherein the generated plurality of questions are long form technical questions.

4. The processor implemented method of claim 1, wherein computing the context difficulty for each of the plurality of questions comprises:
identifying a set of hierarchy levels from one or more parts of the plurality of domain related textbooks for each question from the generated plurality of questions, wherein the one or more parts of the plurality of domain related textbooks are indicative of the parts from where a corresponding question is generated;
assigning (i) a level difficulty score and (ii) a level weight to each hierarchy level from the set of hierarchy levels; and
calculating, the context difficulty based on a level weighted sum of the level difficulty scores of the set of hierarchy levels.

5. The processor implemented method of claim 1, wherein computing the task difficulty for each of the plurality of questions comprises:
determining, (i) a verb similarity, (ii) a template similarity, and (iii) a Wh word similarity between the generated plurality of question and the one or more levels of the BT structure;
computing, an average of (i) the verb similarity, (ii) the template similarity, and (iii) the Wh word similarity between the generated plurality of question and the plurality of levels of the BT structure to obtain a BT level similarity for each of the plurality of questions; and
computing, a level difficulty score weighted sum of the BT level similarity for each of the plurality of questions to obtain the task difficulty for each of the plurality of questions, wherein the level difficulty score is obtained by assigning a difficulty score to each of the plurality of levels of the BT structure.

6. A system, comprising:
a memory storing instructions;
one or more communication interfaces; and
one or more hardware processors coupled to the memory via the one or more communication interfaces, wherein the one or more hardware processors are configured by the instructions to:
receive, a plurality of domain related textbooks, wherein a gold-standard question difficulty dataset is created from the plurality of domain related textbooks, and wherein the gold-standard question difficulty dataset comprises a plurality of pairs of sample questions and a plurality of sample relative difficulty scores corresponding to the plurality of pairs of sample questions;
generate, a plurality of questions from the plurality of domain related textbooks using at least one of (i) an unsupervised template-based technique and (ii) a zero shot pretrained large-language (PLLM) model;
compute, a context difficulty and a task difficulty for each of the plurality of questions, wherein the context difficulty for each of the plurality of questions is computed using a hierarchical structure of the plurality of domain related textbooks, and wherein the task difficulty is computed by determining a similarity between the plurality of questions and a plurality of levels of a Bloom's taxonomy (BT) structure;
compute, a difficulty score for each of the generated plurality of questions based on the context difficulty and the task difficulty; and
train, a supervised question difficulty prediction model by means of weak supervision using the generated plurality of questions and corresponding difficulty scores as a silver-standard training data.

7. The system of claim 6, wherein the system is further configured by the one or more hardware processors to:
predict, the difficulty score for each sample question in the plurality of pairs of sample questions using the trained supervised question difficulty prediction model by means of the weak supervision; and
evaluate, prediction performance of the question difficulty model trained by means of the weak supervision using the gold-standard question difficulty dataset based on a comparison of the predicted difficulty score for each sample question in the plurality of pairs of sample questions with a corresponding sample relative difficulty score from the plurality of sample relative difficulty scores.

8. The system of claim 6, wherein the generated plurality of questions are long form technical questions.

9. The system of claim 6, wherein the one or more hardware processors are further configured to:
identify a set of hierarchy levels from one or more parts of the plurality of domain related textbooks for each question from the generated plurality of questions, wherein the one or more parts of the plurality of domain related textbooks are indicative of the parts from where a corresponding question is generated;
assign (i) a level difficulty score and (ii) a level weight to each hierarchy level from the set of hierarchy levels; and
calculate, the context difficulty based on a level weighted sum of the level difficulty scores of the set of hierarchy levels.

10. The system of claim 6, wherein the one or more hardware processors are further configured to:
determine, (i) a verb similarity, (ii) a template similarity, and (iii) a Wh word similarity between the generated plurality of question and the one or more levels of the BT structure;
compute, an average of (i) the verb similarity, (ii) the template similarity, and (iii) the Wh word similarity between the generated plurality of question and the plurality of levels of the BT structure to obtain a BT level similarity for each of the plurality of questions; and
compute, a level difficulty score weighted sum of the BT level similarity for each of the plurality of questions to obtain the task difficulty for each of the plurality of questions, wherein the level difficulty score is obtained by assigning a difficulty score to each of the plurality of levels of the BT structure.

11. One or more non-transitory computer readable mediums comprising one or more instructions which when executed by one or more hardware processors cause:
receiving, a plurality of domain related textbooks, wherein a gold-standard question difficulty dataset is created from the plurality of domain related textbooks, and wherein the gold-standard question difficulty dataset comprises a plurality of pairs of sample questions and a plurality of sample relative difficulty scores corresponding to the plurality of pairs of sample questions;

generating, a plurality of questions from the plurality of domain related textbooks using at least one of (i) an unsupervised template-based technique and (ii) a zero shot pretrained large-language (PLLM) model;

computing, a context difficulty and a task difficulty for each of the plurality of questions, wherein the context difficulty for each of the plurality of questions is computed using a hierarchical structure of the plurality of domain related textbooks, and wherein the task difficulty is computed by determining a similarity between the plurality of questions and a plurality of levels of a Bloom's taxonomy (BT) structure;

computing, a difficulty score for each of the generated plurality of questions based on the context difficulty and the task difficulty; and training, a supervised question difficulty prediction model by means of weak supervision using the generated plurality of questions and corresponding difficulty scores as a silver-standard training data.

12. The non-transitory computer readable mediums of claim 11, further comprising:

predicting, the difficulty score for each sample question in the plurality of pairs of sample questions using the trained supervised question difficulty prediction model by means of the weak supervision; and evaluating, prediction performance of the question difficulty model trained by means of the weak supervision using the gold-standard question difficulty dataset based on a comparison of the predicted difficulty score for each sample question in the plurality of pairs of sample questions with a corresponding sample relative difficulty score from the plurality of sample relative difficulty scores.

13. The non-transitory computer readable mediums of claim 11, wherein the generated plurality of questions are long form technical questions.

14. The non-transitory computer readable mediums of claim 11, wherein computing the context difficulty for each of the plurality of questions comprises:

identifying a set of hierarchy levels from one or more parts of the plurality of domain related textbooks for each question from the generated plurality of questions, wherein the one or more parts of the plurality of domain related textbooks are indicative of the parts from where a corresponding question is generated;

assigning (i) a level difficulty score and (ii) a level weight to each hierarchy level from the set of hierarchy levels; and calculating, the context difficulty based on a level weighted sum of the level difficulty scores of the set of hierarchy levels.

15. The non-transitory computer readable mediums of claim 11, wherein computing the task difficulty for each of the plurality of questions comprises:

determining, (i) a verb similarity, (ii) a template similarity, and (iii) a Wh word similarity between the generated plurality of question and the one or more levels of the BT structure;

computing, an average of (i) the verb similarity, (ii) the template similarity, and (iii) the Wh word similarity between the generated plurality of question and the plurality of levels of the BT structure to obtain a BT level similarity for each of the plurality of questions; and computing, a level difficulty score weighted sum of the BT level similarity for each of the plurality of questions to obtain the task difficulty for each of the plurality of questions, wherein the level difficulty score is obtained by assigning a difficulty score to each of the plurality of levels of the BT structure.

\* \* \* \* \*